United States Patent [19]

Corvasce et al.

[11] Patent Number: 5,374,671
[45] Date of Patent: Dec. 20, 1994

[54] HYDROPHILIC POLYMER COMPOSITE AND PRODUCT CONTAINING SAME

[75] Inventors: Filomeno G. Corvasce, Mertzig; Tom D. Linster, Gilsdorf, both of Luxembourg

[73] Assignee: The Goodyear Tire & Rubber Company, Akron, Ohio

[21] Appl. No.: 17,894

[22] Filed: Feb. 16, 1993

[51] Int. Cl.$^5$ .................... C08L 9/00; C08K 3/04; C08K 3/22; B60C 5/00
[52] U.S. Cl. ..................... 504/47; 524/52; 524/571; 524/575.5; 524/577; 524/579; 524/580; 152/450; 425/28.1; 264/216
[58] Field of Search ........... 524/47, 52, 571, 571.5, 524/577, 579, 580; 152/450, 404, 405; 425/28.1; 264/216

[56] References Cited

U.S. PATENT DOCUMENTS

| | | | |
|---|---|---|---|
| 3,645,940 | 2/1972 | Stephens et al. | 524/50 |
| 3,673,136 | 6/1972 | Buchanan et al. | 524/50 |
| 3,830,762 | 8/1974 | Abbott | 524/47 |
| 3,914,499 | 10/1975 | Siefert | 428/292 |
| 4,983,651 | 1/1991 | Griffin | 524/47 |
| 5,095,054 | 3/1992 | Lay et al. | 524/47 |
| 5,212,219 | 5/1993 | Griffin | 524/47 |
| 5,234,977 | 8/1993 | Bastioli et al. | 524/47 |

FOREIGN PATENT DOCUMENTS

| | | |
|---|---|---|
| 0404723 | 12/1990 | European Pat. Off. |
| 0404727 | 12/1990 | European Pat. Off. |
| 0404728 | 12/1990 | European Pat. Off. |
| 0409788 | 1/1991 | European Pat. Off. |
| 0409789 | 1/1991 | European Pat. Off. |

OTHER PUBLICATIONS

"Abstract of JP-312329", filed Nov. 27, 1991, and published as JP-05170976-A, Jul. 9, 1993.
Novon Debuts Two Degradable Resins, Begins Building Plant, *Plastics News*, Jun. 18, 1991.

*Primary Examiner*—Nathan M. Nutter
*Attorney, Agent, or Firm*—David E. Wheeler

[57] ABSTRACT

A method of blending a hydrophilic polymer into an elastomer matrix, and products made thereby, are provided. In the illustrated method, a hydrophilic polymer is mixed with an elastomeric base polymer. In one embodiment, the hydrophilic polymer forms fibers in a resulting elastomeric matrix. An elastomeric matrix interspersed with hydrophilic polymer made according to the invention can be used in reinforced elastomeric products such as tires.

14 Claims, 1 Drawing Sheet

HYDROPHILIC POLYMER COMPOSITE AND PRODUCT CONTAINING SAME

BACKGROUND

The invention relates to a method for processing an elastomer, an elastomer made by said method, and tires made using the elastomer.

Prior art composites used in the tire industry comprise rubber compositions, for example composites based on styrene butadiene rubber (SBR), polyisoprene, polybutadiene, polychloroprene, nitrile butadiene rubber (NBR), ethylene propylene diene monomer rubber (EPDM), natural rubber and mixtures thereof.

It is continually a goal in the tire art to provide rubber compounds that enhance traction properties while providing good rolling resistance properties and good wear properties.

As described by Novon Products, a Division of Warner-Lambert Company, 182 Tabor Road, Morris Plains, N.J., starch consists of two types of glucose polymers, linear amylose and branched amylopectin. The distribution of these two polymers affects the properties of the starch. Although starch in dry form is not thermoplastic, it forms a melt in the presence of a plasticizer such as water. The large number of hydroxyl groups in the starch molecule import a B hydrophilic character to the molecule that limits its applicability in the preparation of plastic substitutes based on native starch, but to increase the range of viable applications of starch based plastics in product use, native starches can be blended with degradable synthetics. Since the goal of Novon is to improve the environment by producing biodegradable plastics, Novon notes that when other degradable polymers are blended with starch, or the starch is modified to improve properties or processability, the rate of biodegradation will change, and the challenge of developing starch-based plastic substitutes is to improve the properties while maintaining acceptable degradation rates, and quantification of biodegradation rates in wastewater, soil, and compost environments is an important part of the product development process.

Starch materials have been used as model systems in investigations of physical and engineering properties of foods. Isothermal absorption of water in starch gels gave low water diffusivities which decreased at lower moisture contents (Fish 1958).

Destructured starch compositions that have dimensional stability and hydrophilic properties have been described by Warner-Lambert in EPA 409,789, EPA 409,788, EPA 404,728, EPA 404,727, EPA 404,723 and U.S. patent application Ser. No. 467,892 filed Feb. 18, 1983.

It is believed that similar compositions are produced by Archer-Daniels-Midland.

In accordance with the present invention, the inventors herein have theorized that the hydrophilic properties of the starch based polymers, when used in a tire tread, will provide enhanced traction on wet pavement, because of the wettability of the polymer, while providing good rolling resistance properties on dry pavement.

Accordingly, it is an object of the present invention to provide a method by which the properties of a rubber composite can be optimized for a particular use by adjusting the amount of hydrophilic polymers, and conventional reinforcing fillers (such as carbon black, silica, etc.) in the composite.

SUMMARY OF THE INVENTION

A method of processing hydrophilic polymers into an elastomer is provided. The method comprises blending a 1–33% by weight hydrophilic polymer, based on the total weight of the composition, with a base elastomer.

In one embodiment, the hydrophilic polymer will be chosen to have properties whereby the hydrophilic polymer retains its identity while mixing with the base polymer, and forms fibers in-situ in the polymer blend. The orientation of the fibers may be controlled by processing.

Also provided is an elastomer comprising a base elastomer and a hydrophilic polymer. In one embodiment, the hydrophilic polymer will be present in the elastomer in the form of fibers dispersed in the elastomer. Also provided is a pneumatic tire made using the elastomer of the invention.

DETAILED DESCRIPTION OF THE INVENTION

Figure 1:
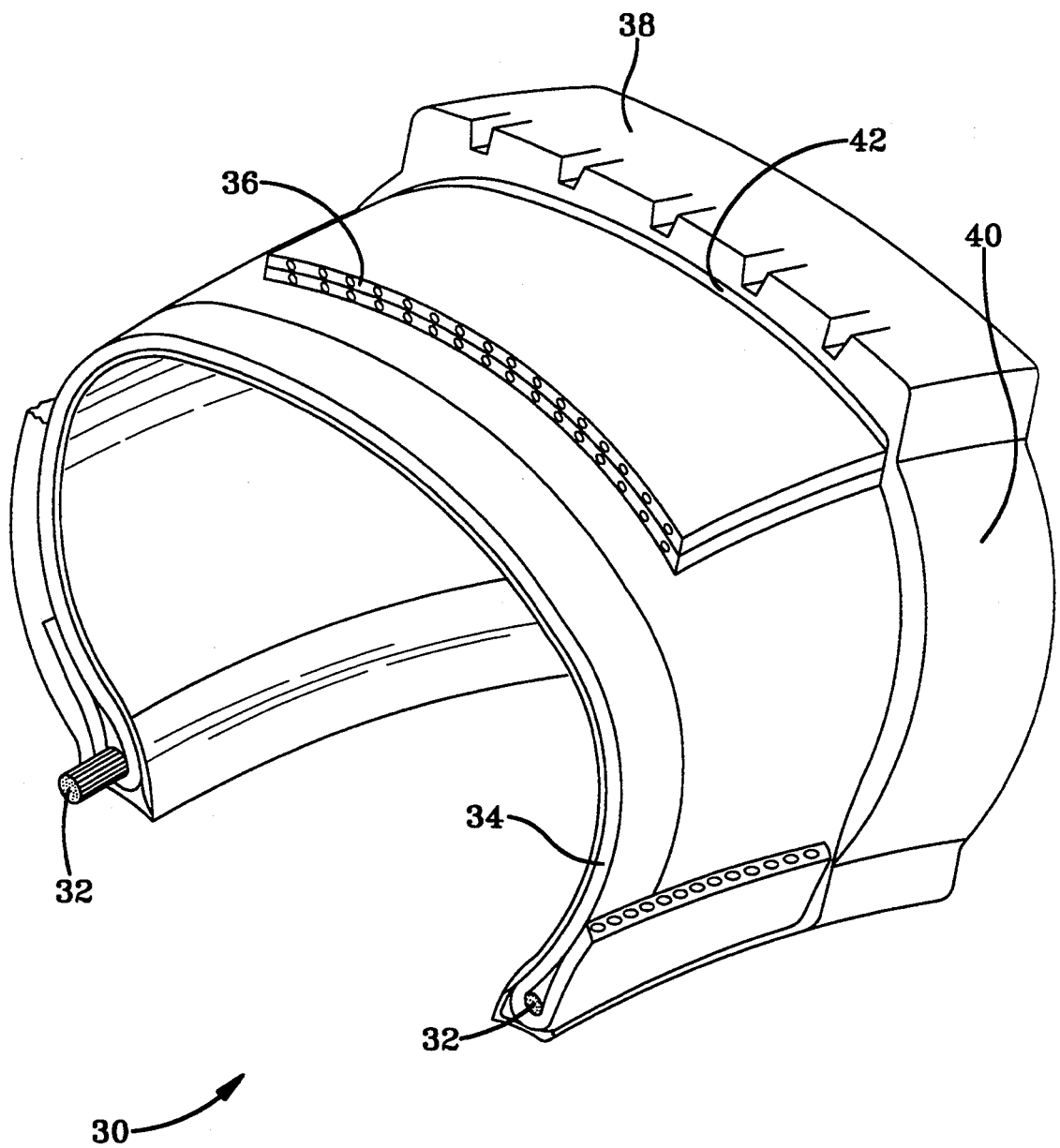
FIG. 1 illustrates a pneumatic tire made using the elastomer of the invention, and the various parts thereof which may contain the elastomer.

The invention relates to a method of processing elastomer with hydrophilic elastomers and elastomers produced by said method. In particular, the invention relates to elastomer which are reinforced by hydrophilic polymers.

Starch can be used to form hydrophilic, thermoplastic polymers having a melting temperature that depends on the mixing condition of the starch material.

Elastomers such as polyisoprene rubber, styrene butadiene rubber (SBR), polybutadiene rubber, nitrile butadiene rubber (NBR), polychloroprene rubber, natural rubber, EPDM (ethylene propylene diene monomer rubbers), and mixtures thereof, can be mixed with a hydrophilic polymer at conventional compounding temperatures when chemically preparing the hydrophilic polymer in-situ, or at a temperature above the melting point of the polymer when a thermoplastic starch polymer is used to melt form the hydrophilic polymer. It has been found in accordance with the present invention that the hydrophilic polymer may comprise 1–50%, preferably 10–40%, and most preferably 15–30% of a resulting base-polymer/hydrophilic-polymer blend.

Examples of hydrophilic polymers which may be used to provide the elastomers of the invention include polymers based on starches. Examples of such polymers are derived from linear amylose, branched amylopectin, and mixtures thereof. In one embodiment, such polymers have the ability to retain their own identity when being mixed with the base elastomer, and accordingly are mixable with the base elastomer while not being miscible, and accordingly, are capable of forming fibers in the matrix of the base elastomer.

The source of such hydrophilic polymers is described in the Background above.

Although it is preferred that the hydrophilic polymer form fibers in the elastomer, those skilled in the art will recognize that homogeneous blends of a base elastomer and a hydrophilic polymer can also be made and used in accordance with the invention.

Optionally 0–3% by weight grafting agent may be added to the elastomer to provide polymeric compatibilizing and potential linking between the base elastomer and the hydrophilic polymer.

With reference now to FIG. 1, a pneumatic tire 30 which is made using the hydrophilic elastomer of the invention is illustrated. It is believed that the hydrophilic elastomer made according to the invention may be used most beneficially in the tread cap of a pneumatic tire. In the illustrated embodiment, tire 30 comprises a pair of beads 32, carcass plies 34 wrapped around beads 32, belts or breakers 36 disposed over carcass plies 34 in the crown area, tread cap 38 disposed over tread base 42 and belts or breakers 36, and sidewalls 40 disposed between tread cap 38 and beads 32.

Since the hydrophilic polymer has low water diffusivities, the hydrophilic property of the elastomer in wet conditions will be most apparent on the surface of the tread. As is known in the art, as the moisture content of a hydrophilic polymer is increased, there is a decrease in the glass transition (Tg) of the polymer. In wet conditions, the hydrophilic polymer absorbs water, and the properties of the polymer at the tread surface change, in proportion to the amount of water absorbed, to provide a softer, more tactile tread surface, thus improving traction.

As the moisture content of the polymer increases above about 22%, the Tg of starch based materials approach the Tg observed at temperatures below room temperature.

Particular hydrophilic polymers contemplated for use in the invention can have a Tg which varies from about 150° C. to about 0° C., depending on its moisture content. It is believed that such polymers available from Warner-Lambert, having a Tg which varies from about 120° C. to 20° C. can be used.

By understanding the changing properties of the hydrophilic polymer, and by fine tuning the tread composite using other additives known to those skilled in the art, a tread rubber composition having high loss (high hysteresis) properties, which directly relates to high traction, in moist conditions, made according to the invention, is possible.

The change in Tg observed in the polymer is reversible, and in dry conditions, the elastomer retains a more conventional matrix structure, is stiffer, and maintains good rolling resistance properties.

Accordingly, the tire of the invention adapts to have specific properties that are most desirable for the specific weather conditions it encounters.

In the method of preparing the hydrophilic polymers of the invention, any conventional mixing equipment known in the art may be used to mix the elastomer/hydrophilic-polymer mixture, including Banbury ® mixers, extruders, and twin screw extruders. The specific properties of the elastomer can be controlled by obtaining specific data on the properties of the specific hydrophilic polymer used, and controlling the amount of the hydrophilic polymer that is used in the elastomer.

About 1 phr to 33 phr hydrophilic polymer (1–50% by weight) in the hydrophilic polymer blend, provides a good range between polymer blends that have good adhesion and low hydrophilic properties, and polymer blends that have high hydrophilic properties.

As is known in the fiber composite processing art, the orientation of fibers and microfibers in a composite can be controlled by the choice of the mixing equipment that is used to mix the composite, and the manner in which equipment is used. Accordingly, when the hydrophilic polymer is in the form of fibers, the orientation of the fibers in the elastomer can be controlled.

A starch derived hydrophilic polymer may be based on amylose, amylopectin, and mixtures thereof, as illustrated by the above named Warner-Lambert patent applications.

Those skilled in the art will recognize that the hydrophilic nature of the polymer used in the elastomer, over time, may enhance the biodegradability of a tire made using said polymer.

While specific embodiments of the invention have been illustrated and described, those skilled in the art will recognize that the invention can be variously modified and practiced without departing from the spirit of the invention. The scope of the invention is limited only by the following claims.

What is claimed is:

1. A method for preparing an elastomer comprising the steps of
   (a) mixing a base elastomer with 1–50 phr hydrophilic polymer to provide an elastomer loaded with a hydrophilic polymer, and
   (b) selecting the hydrophilic polymer such that said hydrophilic polymer has a Tg which varies, dependant on the amount of moisture absorbed therein, from about 150° C. to about 0° C.

2. The method of claim 1 which comprises the further step of extruding or calendering said blend to directionally orient said hydrophilic polymer in the form of fibers.

3. The method of claim 1 wherein said hydrophilic polymer is destructured starch.

4. The method of claim 1 wherein said hydrophilic polymer is selected from the group consisting of destructured amylose, amylopectin, and mixtures thereof.

5. An elastomer comprising
   (a) 67 to 99% by weight base elastomer; and
   (b) 1 to 33% by weight hydrophilic polymer having a Tg which varies, dependant on the amount of moisture absorbed therein, from about 150° C. to about 0° C.

6. The elastomer of claim 5 wherein said hydrophilic polymer is present in said base elastomer in the form of fibers.

7. The elastomer of claim 5 wherein said hydrophilic polymer is a destructured starch.

8. The elastomer of claim 5 wherein said hydrophilic polymer is selected from the group consisting of destructured amylose, amylopectin, and mixtures thereof.

9. A rubber composite pneumatic tire comprising at least a pair of tire beads, carcass plies wrapped around said beads, tread disposed over said carcass plies in a crown area of said tire, sidewalls disposed between said tread and said beads, wherein said tire has at least one component comprising an elastomer comprising,
   (a) 67 to 99% by weight base elastomer; and
   (b) 1 to 33% by weight hydrophilic polymer having a Tg which varies, dependant on the amount of moisture absorbed therein, from about 150° C. to about 0° C.

10. The pneumatic tire of claim 9 wherein said hydrophilic polymer is present in said base elastomer in the form of fibers.

11. The pneumatic tire of claim 10 wherein said fibers are directionally oriented.

12. The pneumatic tire of claim 9 wherein said hydrophilic polymer is destructured starch composition.

13. The pneumatic tire of claim 9 wherein said hydrophilic polymer is selected from the group consisting of destructured amylose, amylopectin, and mixtures thereof.

14. The pneumatic tire of claim 9 wherein said elastomer comprises the tread of said tire.

* * * * *